C. C. MOORE.
STIRRING DEVICE FOR STARCH WASHING VATS.
APPLICATION FILED JUNE 12, 1917.
1,255,626.
Patented Feb. 5, 1918.
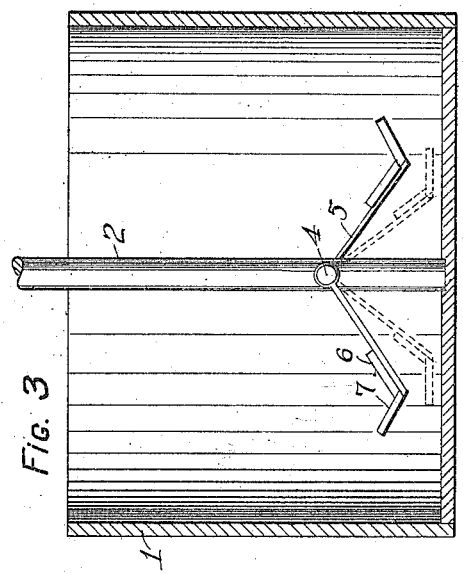
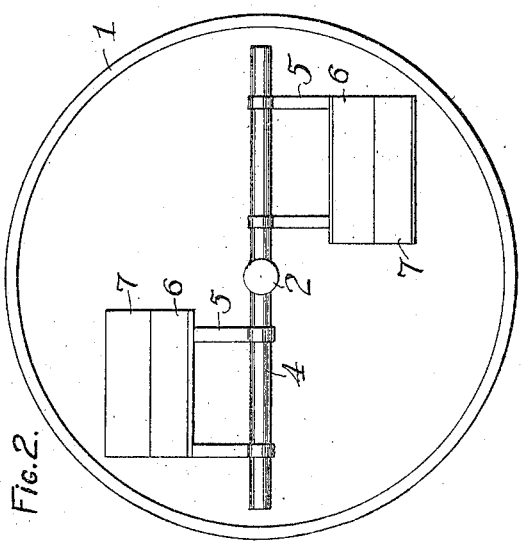
Inventor
C. C Moore

UNITED STATES PATENT OFFICE.

CHARLES C. MOORE, OF MIDDLE RIVER, CALIFORNIA, ASSIGNOR TO VALRON MANUFACTURING COMPANY, OF MIDDLE RIVER, CALIFORNIA, A CORPORATION OF NEW YORK.

STIRRING DEVICE FOR STARCH-WASHING VATS.

1,255,626.  Specification of Letters Patent.  Patented Feb. 5, 1918.

Application filed June 12, 1917. Serial No. 174,195.

*To all whom it may concern:*

Be it known that I, CHARLES C. MOORE, a citizen of the United States, residing at Middle River, county of San Joaquin, State of California, have invented certain new and useful Improvements in Stirring Devices for Starch-Washing Vats, of which the following is a specification.

The subject of this invention is a stirring device for starch washing vats in which paddles are operatively hung from rotary arms, and the objects of the invention are, first, to provide means for preventing the paddles becoming embedded in the starch when it settles, second, to provide paddles which will automatically rise when the stirring action is stopped, third, to provide paddles which will automatically move to operative position when the arms are revolved, fourth, to provide a simple and efficient stirrer for starch washing vats.

With the foregoing and such other objects in view as may hereinafter more fully appear, my invention consists in the novel arrangement and construction of parts set forth in the following description, more particularly pointed out in the claims, and which are shown in the accompanying drawings, it being understood, however, that changes in the structural arrangement and combination of parts may be made within the scope of what is claimed without departing from the spirit or intention of the invention.

One practical embodiment of the invention is shown in the accompanying drawings, wherein:

Figure 1 is a view in elevation of a stirrer constructed in accordance with my invention, the vat in which the same is shown mounted being in section;

Fig. 2 is a plan view of the device;

Fig. 3 is a side elevation of the stirrer in operative position, the vat shown in section and the position of the paddles when the vat is empty in dotted lines;

Fig. 4 is a similar view showing the position of the paddles when the stirrer is at rest and the vat partially filled with water.

Referring to the drawings by numerals of reference:

An ordinary vat 1, such as is used in washing starch, is shown, and turning in the vat is a vertically disposed shaft 2 which is driven by any suitable source of power through a pulley 3, or otherwise. Arms 4 are secured to the shaft 2 and extend radially therefrom, within the vat. Loosely hung from each arm 4, by means of straps 5, is a paddle which is formed of two strips 6 and 7, which are joined along one longitudinal edge, and form an obtues angle with each other. The strip 6 is secured to the straps 5 as shown.

In washing starch to remove the impurities, water is mixed with the starch and the mixture thoroughly stirred. The starch is then allowed to settle; the water drawn off, and fresh water introduced to the vat, when the stirring is again repeated. This action is continued until the starch is sufficiently cleaned.

When the starch is allowed to settle in the bottom of the vat, it often becomes so set as to lock the stirrers or paddles so that it is impossible to revolve them without first cutting away the starch to free the paddles.

With the paddles constructed as herein shown, as soon as stirring stops the paddles, being of buoyant material, will float upward, as shown in Fig. 4, and be free from the settling starch. When the fresh water is added and the shaft 2 revolved, the paddles, because of the inclination of the blades, will be forced downwardly by the pressure of the water and contact the surface of the starch to again stir the same, assuming the position shown in full lines in Fig. 3.

Having described my invention, what I claim as new and desire to secure by Letters Patent, is:—

1. A stirring device for starch washing, comprising a revoluble shaft, arms extending from the shaft, and paddles loosely hung from the arms, each paddle formed of two strips joined along one longitudinal edge and disposed to form an obtuse angle to each other.

2. A stirring device for starch washing, comprising a revoluble shaft, arms extending from the shaft and floating paddles hung from the arms, each paddle formed of two strips joined along one longitudinal edge and disposed to form an obtuse angle to each other, whereby when the shaft is revolved the paddles will be autimatically lowered.

3. A stirring device for starch washing, comprising a vat, a vertical shaft revoluble in the vat, arms extending from the shaft, straps loosely hung from the arms, and paddles secured to the straps, each of said paddles formed of two strips joined along one longitudinal edge and disposed to form an obtuse angle to each other.

In testimony whereof, I affix my signature, in the presence of two witnesses.

CHAS. C. MOORE.

Witnesses:
A. M. COLE,
JNO. MCCALLAN.

Copies of this patent may be obtained for five cents each, by addressing the "Commissioner of Patents, Washington, D. C."